March 27, 1945.  T. H. LJUNGGREN ET AL  2,372,590

HIGH SPEED INDUCTION MOTOR ROTOR

Filed Oct. 5, 1942

Inventors
Thor H. Ljunggren
Willis F. Moore
by Wright Brown Quinby May
Attys.

Patented Mar. 27, 1945

2,372,590

UNITED STATES PATENT OFFICE 2,372,590

HIGH SPEED INDUCTION MOTOR ROTOR

Thor H. Ljunggren, Charlestown, N. H., and Willis F. Moore, Springfield, Vt., assignors to Bryant Chucking Grinder Company, Springfield, Vt., a corporation of Vermont Application October 5, 1942, Serial No. 460,750

2 Claims. (Cl. 172—36)

This invention relates to rotors for induction motors and has for an object to provide such a rotor capable of very high sustained speeds, such as 50,000 R. P. M. and above. Such rotors are of particular value, for example, as spindles for small diameter grinding wheels, since in order to provide a surface velocity for such a wheel sufficiently high to produce a good finish on the work being ground, a high angular velocity of the wheel is essential. For example, a wheel 3/8" diameter for grinding small holes must be rotated at about 50,000 R. P. M. to produce a desired linear grinding velocity of its surface of 5,000 feet per minute. If this wheel is reduced in diameter as by wear and truing to 1/4 inch the velocity should be increased to 75,000 R. P. M. Furthermore, in order that the rotor may have sufficient stiffness, and that there may be room for the necessary windings in the stator, the rotor may have to be of a diameter considerably larger than that of the grinding wheel, so that the surface speed of the rotor must be exceedingly high to produce the desired high linear velocity of the wheel surface. The desired rotor speed may be produced by the use of high frequency alternating current applied to the stator windings. This current may be derived from power of commercial frequency by the use of motor generator sets or other convenient means.

Certain problems arise in connection with such high speed rotors which are not found, at least to the same degree in rotors designed to rotate at lower speeds, caused, for example, by the much greater centrifugal force generated at the high speed. One of these problems resides in producing sufficiently high strength to resist bursting of the rotor. Another resides in producing a sufficiently accurate rotational balance, but with freedom from excessive noise.

A further problem arises from the development of heat in the rotor.

This invention, therefore, has for objects the solution of these and other problems to as great an extent as possible.

For a complete understanding of this invention, reference may be had to the accompanying drawing in which Figure 1 is a fragmentary central longitudinal section through an induction motor showing, in side elevation, a rotor embodying the invention.

Figure 1:
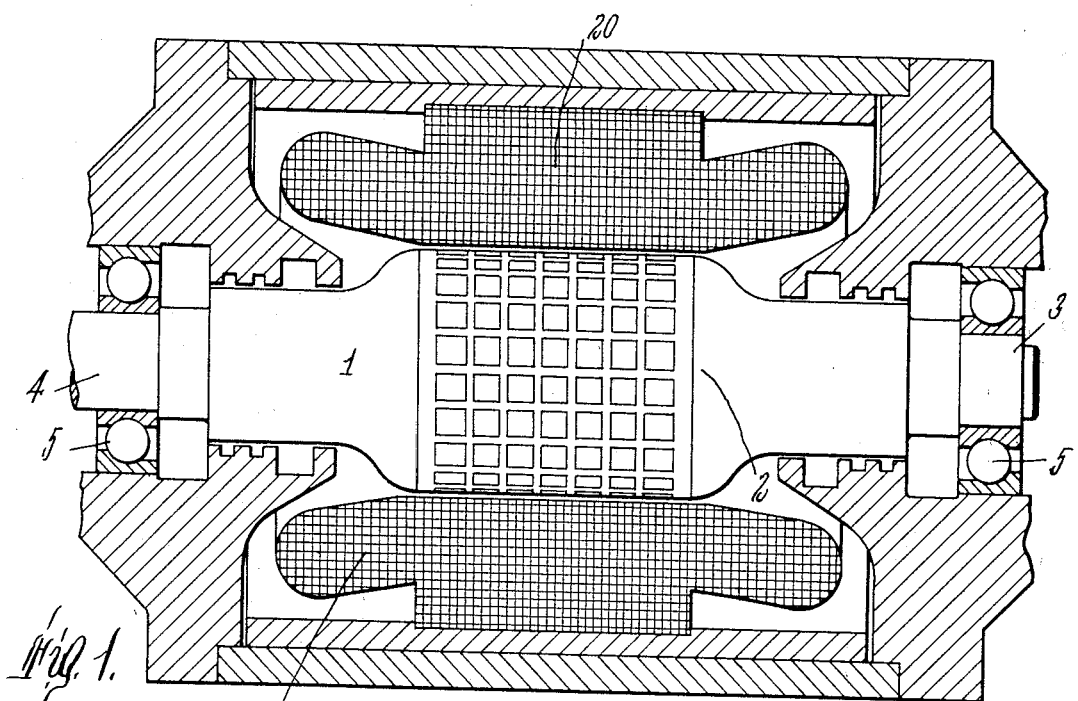
Figure 2:
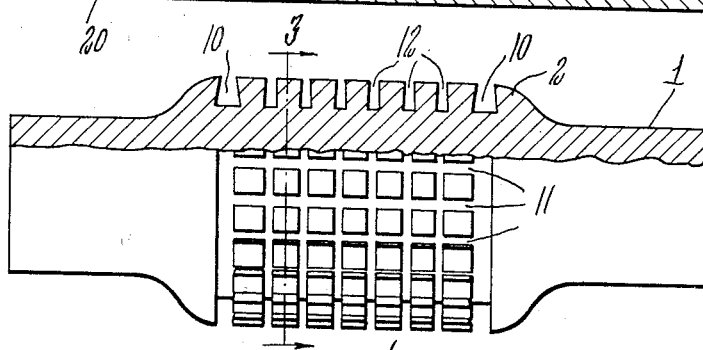
Figure 2 is a view partly in side elevation and partly broken away and in section showing the rotor in an early stage of manufacture.
Figure 3:
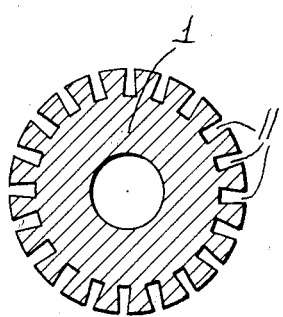
Figure 3 is a cross sectional view on line 3—3 of Figure 2.
Figure 4:
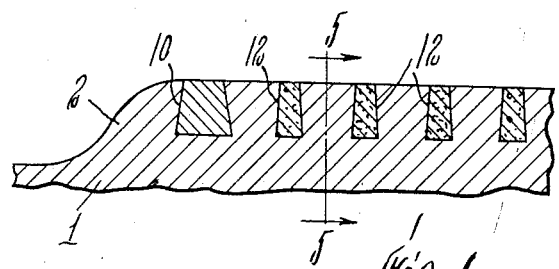
Figure 4 is a fragmentary longitudinal section of the completed rotor.
Figure 5:
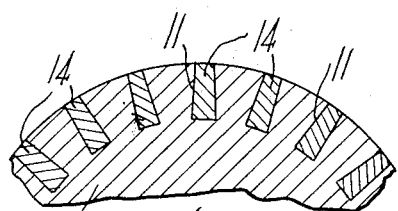
Figure 5 is a detail section on line 5—5 of Figure 4.

Referring to the drawing, in Figures 2 and 3 is illustrated a rotor blank comprising a shaft 1 having an integral enlarged diameter portion 2 intermediate to its ends, this shaft being preferably of machine steel or other suitable ferrous material. The shaft is also provided, as shown in Figure 1, with reduced diameter portions 3 and 4 for mounting in bearings 5, and one of these portions, as 4, may be extended and may be suitably shaped to receive a tool such as a grinding wheel (not shown) which it is desired to rotate by the rotation of the motor rotor. The intermediate portion 2 is shown as provided with a pair of circumferential slots 10 which are wider at their roots than at their outer edges, as shown being substantially trapezoidal in cross section. These slots 10 are spaced apart, being positioned toward the ends of the intermediate portion 2, and they are joined by a series of longitudinal slots 11 arranged about the periphery of the rotor in circular series about its central axis. These slots 11, also, are wider at their roots than at their outer portions, being substantially trapezoidal in cross section. There may be, also, other circumferential slots 12 arranged between the slots 10. If desired, these slots also may be formed wider at their roots than at their outer ends.

The slots 10 and 11 are substantially filled with metal having a greater coefficient of electrical conductivity than the material of the shaft 1. While various metals may be used, we have in actual tests found it most satisfactory to use silver or an alloy with so high a percentage of silver that this metal's good electrical characteristics have not been substantially impaired. The term "silver" as claimed herein is therefore intended to include such alloys as well as pure silver. This metal filling 14 for the slots 10 and 11 is preferably placed in position by fusing it into the slots, as in the methods commonly employed in electrical or flame welding, but it may be molded, brazed, or otherwise secured, and when in position it provides a squirrel cage structure for the rotor embodying longitudinally extended conductors arranged in circular series about the axis of the rotor and joined by conducting rings of the same material. The metal filling 14 need not be bonded with the metal of the rotor so long as it forms a tight fit in its retainer slots but bonding helps to insure safety against the severe centrifugal forces developed by the extremely high speeds of rotation for which this rotor is intended. Where slots 12 are employed, these are for the purpose of diminishing eddy current flow throughout the body of the rotor, and in order to provide a smooth external surface for the rotor these slots between the slots 11 may be filled as with non-conducting and non-magnetic material, such, for example, as a ceramic material or a hard resin capable of withstanding the severe stresses. It has been found in practice that a solid integral rotor is preferable for such high speed services to the usual arrangement of a central shaft to which are applied thin annular laminations. With the high speeds desirable in accordance with this invention laminations do not well withstand the exceedingly high centrifugal forces and also make more difficult the balancing of the rotor. In the high frequencies with which we are here concerned the magnetic flux does not penetrate deeply and as a result the induced flow of Foucalt currents, or disturbing eddy currents, will be close to the periphery of the rotor. This makes it less necessary to have the rotor made up of laminations and makes it possible to build the rotor body of one solid piece and integral with the shaft portions. The trapezoidal cross section of the conductors is also important since not only does it aid in securing the necessary mechanical strength to resist centrifugal force, but it also permits a substantial width of conductor to be at the surface of the rotor where it is effective. If we consider the rotor as a beam subjected to rotation, it is obvious that a rotor so constructed is superior in load characteristics to the conventional rotor fabricated of laminations assembled on a separate shaft portion.

The formation of undesirable eddy currents through the body of the rotor may be reduced to a practicable extent by the intermediate slots 12. It is desirable that the slots be filled either with the metal or the non-conductive, non-magnetic material in the slots 12 in order to provide a smooth exterior surface for the rotor so as to facilitate rotarily balancing the rotor and to minimize noise. For the latter reason it is also important that in the balancing of the rotor no holes be drilled in the rotor to remove excess metal as is commonly done in balancing rotating parts. With such high speed rotors, balancing may be effected by grinding off excess material which causes unbalance.

The rotor so constructed is mounted within a stator which may have the usual stator windings 20 as shown in Figure 1, the desirable high speed being produced in impressing on the stator windings high frequency alternating current. The rotor being integral with the shaft, an exceedingly strong, stiff and sturdy construction is provided which is able to withstand the stresses produced by reason of the high velocity.

From the foregoing description of an embodiment of this invention, it should be evident to those skilled in the art that various changes and modifications might be made without departing from the spirit or scope of this invention as defined by the appended claims.

We claim:

1. A high speed motor rotor, comprising a shaft having an integral enlarged diameter portion intermediate to its ends, said enlarged diameter portion having a pair of circumferential slots spaced axially and adjacent to opposite ends thereof, and peripheral slots arranged lengthwise in circular series about the axis of said portion and joining said circumferential slots, said circumferential and peripheral slots being filled with silver bonded to the material of said portion, said portion having circumferentially arranged slots between said spaced slots and across which the metal filling of said lengthwise slots extends, said last mentioned circumferential slots being filled with non-conducting, non-magnetic material and providing a smooth continuous surface therewith.

2. A high speed motor rotor, comprising a shaft having an integral enlarged diameter portion intermediate to its ends, said enlarged diameter portion having a pair of circumferential slots spaced axially and adjacent to opposite ends thereof, and peripheral slots arranged lengthwise in circular series about the axis of said portion and joining said circumferential slots, said circumferential and peripheral slots being filled with metal having a higher conductivity than the material of said portion, said portion having circumferentially arranged slots between said spaced slots and across which the metal filling of said lengthwise slots extends, said last mentioned circumferential slots being filled with non-conducting, non-magnetic material and providing a smooth continuous surface therewith.

THOR H. LJUNGGREN.
WILLIS F. MOORE.